United States Patent
Song et al.

(10) Patent No.: US 9,424,455 B2
(45) Date of Patent: Aug. 23, 2016

(54) VEHICLE INFORMATION INSPECTING APPARATUS

(71) Applicant: Hyundai Motor Company, Seoul (KR)

(72) Inventors: Jaehun Song, Seoul (KR); Jongho Maeng, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/566,088

(22) Filed: Dec. 10, 2014

(65) Prior Publication Data

US 2016/0086006 A1    Mar. 24, 2016

(30) Foreign Application Priority Data

Sep. 22, 2014 (KR) .......................... 10-2014-0126182

(51) Int. Cl.
*G06K 7/10* (2006.01)

(52) U.S. Cl.
CPC ........ *G06K 7/10861* (2013.01); *G06K 7/10574* (2013.01)

(58) Field of Classification Search
CPC ....................... G06K 7/10861; G06K 7/10574
See application file for complete search history.

(56) References Cited

U.S. PATENT DOCUMENTS

2006/0143173 A1 * 6/2006 Cancilla ................. G08G 1/015

FOREIGN PATENT DOCUMENTS

| DE | 10102922 A1 * | 7/2002 | .......... G01B 11/002 |
| JP | 07-234914 A | 9/1995 | |
| KR | 10-0167984 B1 | 9/1998 | |

* cited by examiner

*Primary Examiner* — Sonji Johnson
(74) *Attorney, Agent, or Firm* — Mintz Levin Cohn Ferris Glovsky and Popeo, P.C.; Peter F. Corless (57) ABSTRACT

A vehicle information inspecting apparatus installed on a vehicle body moving line for moving a vehicle body on which a vehicle identification number (VIN) is carved and a barcode is attached, and for recognizing and inspecting the barcode and the VIN, includes: an installation frame installed on the vehicle body moving line in a workplace, a first moving unit installed in an upper portion of the installation frame and allowing a moving block to move in a vehicle width direction of the vehicle body, a second moving unit installed at one side of the moving block and allowing a moving rod to move in upward and downward directions on the installation frame, and a measure module photographing and recognizing the barcode or the VIN and installed on a lower end of the moving rod so as to transmit the recognized VIN or the recognized barcode to a controller.

15 Claims, 6 Drawing Sheets

VEHICLE INFORMATION INSPECTING APPARATUS

CROSS-REFERENCE TO RELATED APPLICATION

This application claims priority to and the benefit of Korean Patent Application No. 10-2014-0126182 filed in the Korean Intellectual Property Office on Sep. 22, 2014, the entire contents of which are incorporated herein by reference.

BACKGROUND (a) Technical Field

The present disclosure relates to a vehicle information inspecting apparatus. More particularly, the present disclosure relates to a vehicle information inspecting apparatus that can capture a photograph and accurately inspect information of a moving vehicle body using a vehicle identification number (VIN) or a barcode of the vehicle body, regardless of the position thereof, while the vehicle is in motion.

(b) Description of the Related Art

In general, a vehicle maker manufactures vehicles via several processes for assembling approximately twenty thousand to thirty thousand components. In particular, a vehicle body is formed as a first step of a vehicle manufacturing process by manufacturing a vehicle body panel in a press process, moving the vehicle body panel to a vehicle body factory, and then assembling components of the vehicle body to complete the vehicle body in a white body state.

Every vehicle body is constructed with its own respective vehicle identification number (VIN). In this regard, vehicle bodies are assigned VINs according to the type of vehicle body that enters the build process, a corresponding VIN is carved on a portion of the vehicle body so as to convey the vehicle type, and a barcode is attached.

A vehicle body is completed by moving the vehicle body carved with the VIN and with a barcode attached thereto over to a design process where the vehicle body can be moved along an assembly line in order to mount a side, a roof, a rear panel, etc. on the vehicle body, perform a painting operation, and then assemble and mount various convenience equipment, as well as an engine, a transmission, and interior and exterior materials. Here, the VIN or barcode carved with the moved vehicle body is recognized, and components corresponding to the corresponding vehicle type are mounted according to information obtained from the VIN and the barcode. In this case, in order to recognize the VIN or the barcode, a vehicle information inspecting apparatus using a general camera can be used.

Notably, the aforementioned conventional vehicle information inspecting apparatus is configured to inspect only a one-direction VIN or barcode. However, in order to inspect VINs that are positioned at different positions according to vehicle type, problems arise in that inspecting apparatuses need to be separately installed for respective vehicle types. Thus, it is difficult to commonly apply the vehicle information inspecting apparatus to various vehicles, and installation costs can increase.

In addition, during inspection of a VIN or a barcode, an image captured by a camera may be distorted by lighting installed on a moving line, making it difficult to accurately inspect a VIN of a vehicle body. Furthermore, after inspection, the captured result is checked via a closed circuit television (CCTV) to which the image is transmitted through a camera, and then an operator directly inputs the image, often causing input errors. Even further, repetition of checking production and inputting of the inspection result may increase fatigue of the operator, thereby reducing productivity and increasing labor costs.

The above information disclosed in this Background section is only for enhancement of understanding of the background of the disclosure, and therefore it may contain information that does not form the related art that is already known in this country to a person of ordinary skill in the art.

SUMMARY

The present disclosure has been made in an effort to provide a vehicle information inspecting apparatus having advantages of accurately recognizing a vehicle identification number (VIN) carved on a vehicle body moved along a vehicle body moving line irrespective of the position of the VIN or the barcode, accurately inspecting information of the vehicle body, and automatically inputting the information so as to be commonly applied to various types of vehicles, thereby reducing installation costs.

Embodiments of the present disclosure provide a vehicle information inspecting apparatus installed on a vehicle body moving line for moving a vehicle body on which a vehicle identification number (VIN) is carved and a barcode is attached, and for recognizing and inspecting the barcode and the VIN, including: an installation frame installed on the vehicle body moving line in a workplace, a first moving unit installed in an upper portion of the installation frame and allowing a moving block to move in a vehicle width direction of the vehicle body, a second moving unit installed at one side of the moving block and allowing a moving rod to move in upward and downward directions on the installation frame, and a measure module photographing and recognizing the barcode or the VIN and installed on a lower end of the moving rod so as to transmit the recognized VIN or the recognized barcode to a controller.

The first moving unit may include a lead screw rotatably installed in a length direction of the installation frame in an upper portion of the installation frame toward the vehicle body and screwed to the moving block, and a first drive motor installed on an upper portion of the installation frame to correspond to the lead screw and having a rotational axis connected to the lead screw.

The first drive motor may be electrically connected to the controller and may include a servo motor, a rotating direction and a rotation speed of which are adjustable according to a control signal of the controller.

The moving block may have an upper surface connected to a railblock sliding on a guide rail formed in a length direction on an upper internal side surface of the installation frame.

The second moving unit may include a gear box installed at one side of the moving block, a second drive motor installed at an external portion of the gear box and having a rotation shaft inserted into the gear box, a guide housing installed in the gear box at an opposite side of the moving block and having both end portions of the moving rod protruding into the guide housing so as to be moveable in upward and downward directions, a drive gear installed at a rotation shaft of the second drive motor in the gear box, and a rack gear formed on one surface of the moving rod so as to engage with the drive gear.

The second drive motor may be electrically connected to the controller and may include a servo motor, a rotating direction and a rotation speed of which are adjustable according to a control signal of the controller.

The measure module may include a coupling plate installed at a lower end of the moving rod, a housing installed on a lower portion of the coupling plate through an inclination adjusting unit and having an open lower portion, a camera installed in an inner central portion of the housing, an installation plate installed on the opened lower surface of the housing and having a through hole formed in a central portion thereof to correspond to the camera, and at least one lighting assembly installed to be spaced apart from the through hole at a predetermined angle on a lower surface of the installation plate.

The inclination adjusting unit may include an operation cylinder including an operation rod having a front end hinged to one side of the housing, wherein the operating rod is installed downwardly at an opposite side of the vehicle body below the coupling plate, and a coupling link having one end mounted on the coupling plate at an opposite side of the operation cylinder toward the vehicle body and the other end hinged to the other side of the housing.

The at least one lighting assembly may include a first lighting source installed to be spaced apart from the through hole at a predetermined interval on a lower surface of the installation plate and installed to emit light toward a lower portion of the housing, a second lighting source installed to be spaced apart from the through hole at a predetermined angle on the lower surface of the installation plate in an opposite direction of the first lighting and disposed to be inclined at a set angle toward the lower portion of the housing so as to adjust an inclination angle, a third lighting source installed on the lower surface of the installation plate at a position spaced apart from the second lighting at a predetermined angle and disposed to be inclined at the set angle toward the lower portion of the housing, and a fourth lighting source installed on the lower surface of the installation plate at a portion spaced apart from the third lighting source at a predetermined angle and disposed to be inclined at the set angle toward the lower portion of the housing.

The first lighting source and the second lighting source may emit red light.

The second lighting source may be installed on an installation bracket that is installed on the installation plate through a rotation rod and is rotated on the installation bracket according to a selective operation of an operation motor, a rotation shaft of which is connected to one end of the rotation rod, at one side of the installation bracket.

The second, third, and fourth lighting sources may be disposed in a substantially triangular shape to be spaced apart from the camera at an angle of approximately 120 degrees.

The third lighting source may emit green light.

The fourth lighting source may emit blue light.

The second lighting source may emit light in the same state where the third lighting source or the fourth lighting source is inclined at the same inclination angle, and the first lighting source may be OFF, when the camera photographs the vehicle body substantially close to the measure module.

The second lighting source may emit light together with the first lighting source while being rotated toward a lower surface of the housing, and the third lighting source and the fourth lighting source may be OFF, when the camera photographs the vehicle body spaced apart from the measure module by a predetermined distance or more.

<Description of symbols>

| 3: vehicle body moving line | 15: vehicle body |
|---|---|
| C: controller | 100: vehicle information inspecting apparatus |
| 103: installation frame | 110: first moving unit |
| 111: moving block | 113: lead screw |
| 115: first drive motor | 117: guide rail |
| 119: railblock | 120: second moving unit |
| 121: moving rod | 123: gear box |
| 125: second drive motor | 127: guide housing |
| G1: drive gear | G2: rack gear |
| 130: measure module | 131: coupling plate |
| 13: housing | 135: camera |
| 137: installation plate | 139: lighting assembly |
| 139: first lighting source | 139b: second lighting source |
| 139c: third lighting source | 139d: fourth lighting source |
| 141: installation bracket | 143: rotation rod |
| 145: operating motor | H: through hole |

DETAILED DESCRIPTION OF THE EMBODIMENTS

Embodiments of the present disclosure will hereinafter be described in detail with reference to the accompanying drawings.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is configured to execute the program instructions to perform one or more processes which are described further below. Moreover, it is understood that the below methods may be executed by an apparatus comprising the controller, whereby the apparatus is known in the art to be suitable for vehicle information inspection.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring to FIGS. 1 to 5, a vehicle information inspecting apparatus 100 according to embodiments of the present disclosure accurately recognizes a vehicle identification number (VIN) or a barcode carved on a vehicle body 5 that is moved along a vehicle body moving line 3 irrespective of a position of the VIN or the barcode, accurately inspects information of the vehicle body 5, and automatically inputs the information, and thus the vehicle information inspecting apparatus 100 may be commonly applied to various vehicle types, thereby reducing installation costs.

Figure 1:
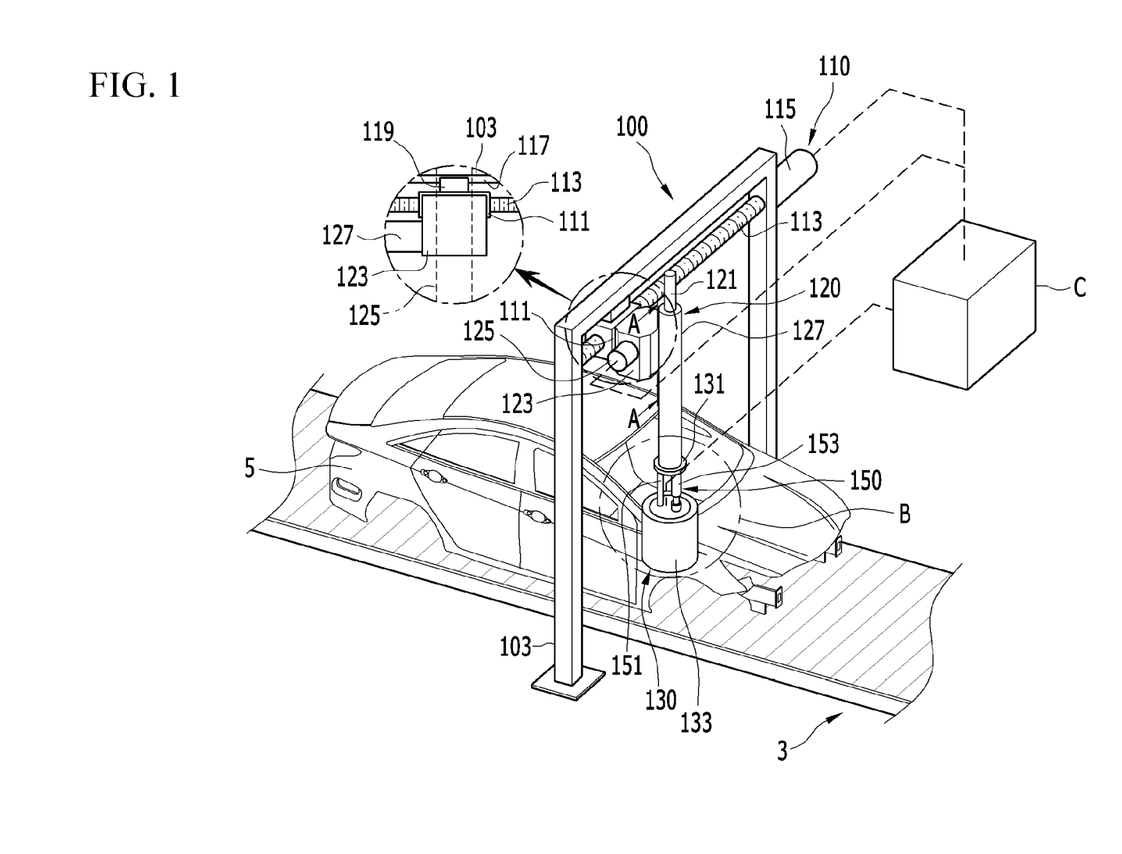
FIG. 1 is a schematic diagram of a vehicle information inspecting apparatus according to embodiments of the present disclosure.

To this end, as shown in FIG. 1, the vehicle information inspecting apparatus 100 according to embodiments of the present disclosure is installed on the vehicle body moving line 3 for moving the vehicle body 5 on which a VIN is carved and a barcode is attached, recognizes and inspects the VIN carved on the vehicle body 5, and includes an installation frame 103, first and second moving units 110 and 120, and a measure module 130.

First, an installation frame 103 is installed on the vehicle body moving line 3 in a workplace. The installation frame 103 may have a "U" shape by vertically bending both end portions based on a central portion that is positioned upward and fixing the flame on a bottom of the workplace.

According to the present embodiments, the first moving unit 110 is installed to be downwardly spaced apart from an upper internal surface of the installation frame 103 by a predetermined interval and allows a moving block 111 to move in a vehicle width direction of the vehicle body 5.

The first moving unit 110 may further include a lead screw 113 and a first drive motor 115 in addition to the moving block 111. First, the lead screw 113 is spaced apart from the upper internal surface of the installation frame 103 toward the vehicle body 5 by a predetermined interval and is rotatably installed in a length direction of the installation frame 103. Thus, the moving block 111 is screwed to the lead screw 113 and is rotated on the lead screw 113 in a width direction of the vehicle body 5 according to rotation of the lead screw 113 in a forward direction or an opposite direction.

In addition, the first drive motor 115 is installed on an upper portion of the installation frame 103 to correspond to the lead screw 113, and a rotational axis of the first drive motor 115 is connected to one end of the lead screw 113. The first drive motor 115 may be electrically connected to a controller C and may include a servo motor, a rotating direction and a rotation speed of which are adjustable according to a control signal of the controller C. An upper surface of the moving block 111 may be connected to a railblock 119 that slides on a guide rail 117 formed in a length direction on the upper internal surface of the installation frame 103. Thus, the moving block 111 may be stably moved by the railblock 119 that slides along the guide rail 117 while being prevented from being rotated together with the lead screw 113 during rotation of the lead screw 113 by the railblock 119 connected to the guide rail 117.

When the vehicle body 5 enters the vehicle body moving line 3, the aforementioned configured first moving unit 110 may operate the first drive motor 115 according to a control signal of the controller C in order to rotate the lead screw 113 in a forward direction or an opposite direction. Then, the moving block 111 is moved according to a position of a barcode or a VIN carved in the vehicle body 5 having various shapes and sizes, and an operation of the first drive motor 115 is stopped when the moving block 111 is at a home position. When the vehicle information inspecting apparatus 100 completely inspects a VIN or a barcode of the vehicle body 5 through the measure module 130, the first moving block 111 may be restored to an initial position in order to prevent the moved vehicle body 5 and the measure module 130 from interfering with each other.

In the present embodiments, the second moving unit 120 is installed at one side of the moving block 111 in a moving direction of the vehicle body 5 and allows a moving rod 121 to move in upward and downward directions on the installation frame 103. The second moving unit 120 includes a gear box 123, a second drive motor 125, a guide housing 127, a drive gear G1, and a rack gear G2, in addition to the moving rod 121.

First, the gear box 123 is installed at one side of the moving block 111 in a moving direction toward a front side of the vehicle body 5. The second drive motor 125 is installed at an external portion of the gear box 123 in a width direction of the vehicle body 5, and a rotation shaft of the second driving motor 125 is inserted into the gear box 123. The second drive motor 125 may be electrically connected to the controller C and may include a servo motor, a rotating direction and a rotation speed of which are adjustable according to a control signal of the controller C.

Figure 2:
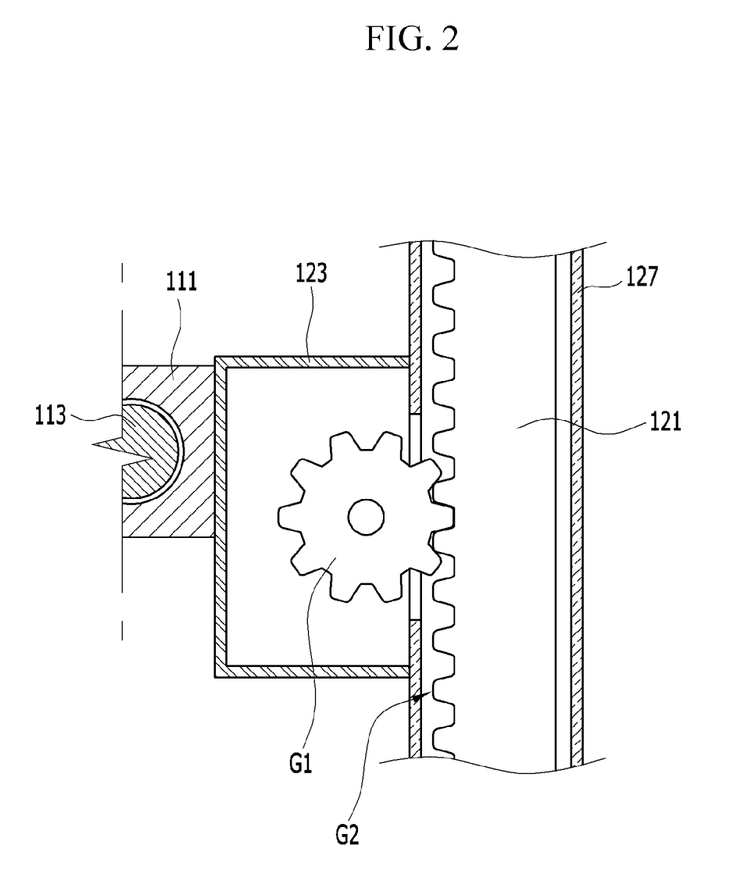
FIG. 2 is a cross-sectional view taken along a line A-A of FIG. 1.

The guide housing 127 is installed in a gear box 123 at an opposite side of the moving block 111, and a portion of both ends of the moving rod 121 is inserted to protrude into the guide housing 127 and to be moveable in upward and downward directions. As shown in FIG. 2, a portion of the guide housing 127, installed on the gear box 123, is opened to be connected to an internal portion of the gear box 123.

In the present embodiments, the drive gear G1 may be installed at a rotation shaft of the second drive motor 125 in the gear box 123 and a gear tooth may be partially inserted into the opened portion of the guide housing 127. The rack gear G2 is formed on one surface of the moving rod 121 to correspond to the drive gear G1 and engages with the drive gear G1, the gear tooth of which is partially inserted to the opened portion of the guide housing 127.

When the moving block 111 of the aforementioned configured second moving unit 120 is moved via an operation of the first moving unit 110, and the measure module 130 is at a home position of a VIN and barcode of the vehicle body 5, the second drive motor 125 is rotated in a forward direction according to a control signal of the controller C. Then, the drive gear G1 may be rotated in a forward direction while being engaged with the rack gear G2 formed on one surface of the moving rod 121 to lower the moving rod 121 toward a lower portion of the vehicle body 5. When the moving rod 121 is elevated, the controller C rotates a rotation shaft of the second drive motor 125 in an opposite direction to rotate the drive gear G1 in an opposite direction. Thus, the moving rod 121 is elevated by the drive gear G1 that is rotated in an opposite direction while being engaged with the rack gear G2.

In the present embodiments, the measure module 130 photographs and recognizes the barcode or the VIN carved on the vehicle body 5 and is installed on a lower end of the moving rod 121, so as to transmit the recognized VIN or barcode to the controller C.

Figure 3:
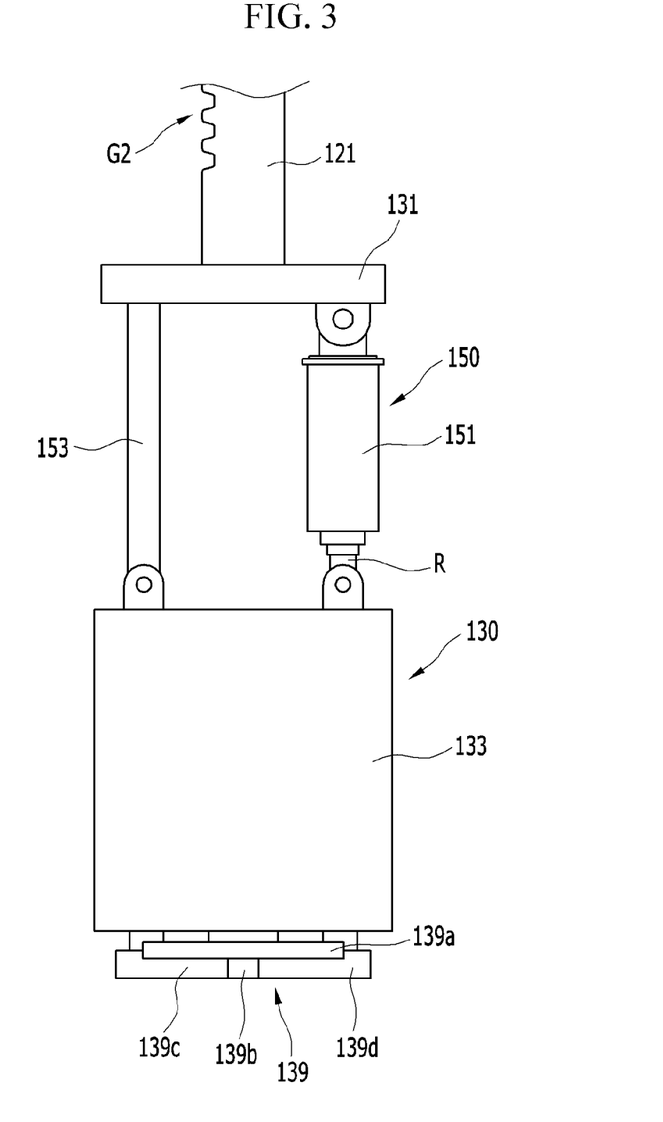
FIG. 3 is an enlarged view of a portion B of FIG. 1 and a front view of a measure module applied to a vehicle information inspecting apparatus according to embodiments of the present disclosure.
Figure 5:
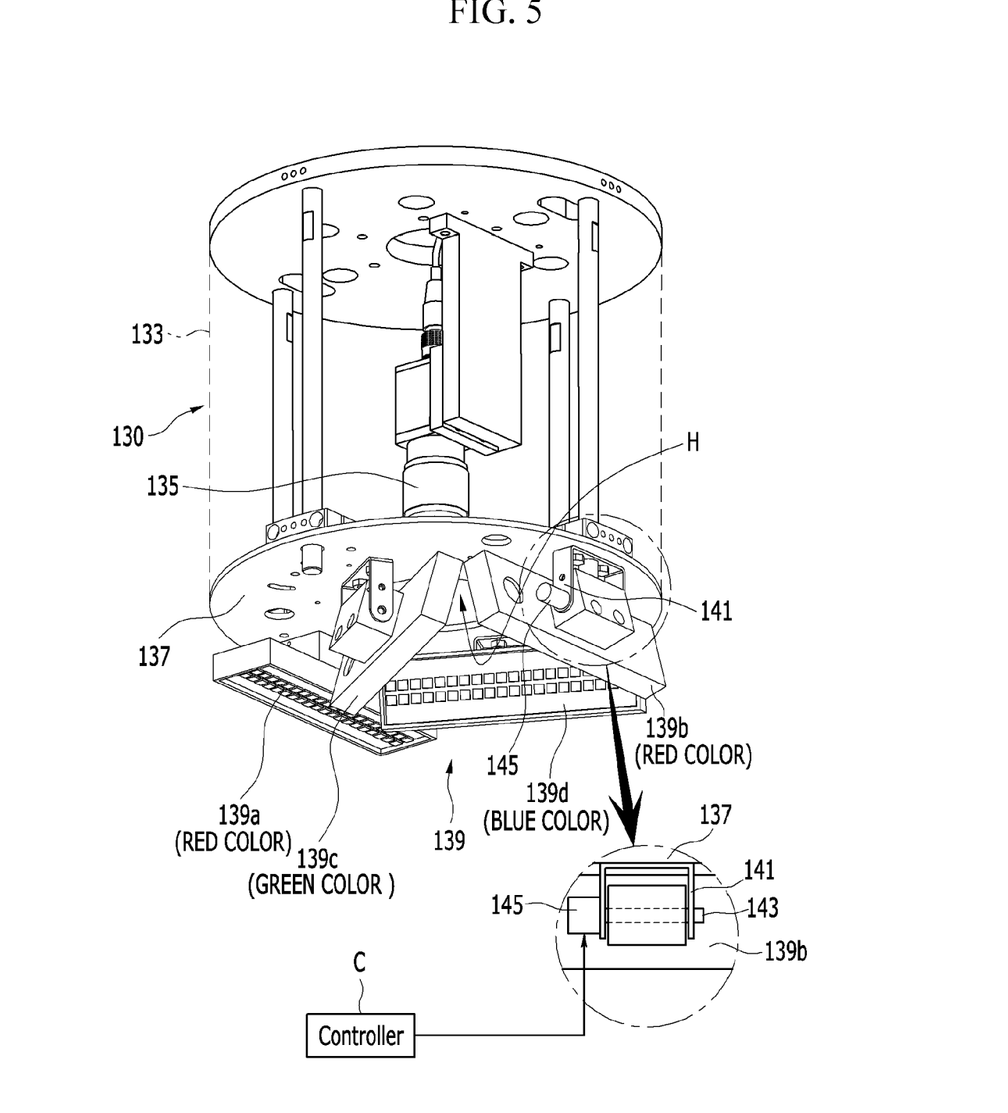
FIG. 5 is a bottom view of a measure module of a vehicle information inspecting apparatus according to embodiments of the present disclosure.

As shown in FIGS. 3 and 5, the measure module 130 includes a coupling plate 131, a housing 133, a camera 135, an installation plate 137, and a lighting assembly 139. First, the coupling plate 131 is installed to a lower end of the moving rod 121 and installed so as to partially protrude from a lower end of the guide housing 127. The housing 133 is installed on a lower portion of the coupling plate 131 through an inclination adjusting unit 150, and a lower surface of the housing 133 is opened. The housing 133 may have a closed upper surface and may have a cylinder shape having a space formed therein.

The inclination adjusting unit 150 includes an operation cylinder 151 and a coupling link 153. First, the operation cylinder 151 includes an operating rod R, and the operating rod R is installed downwardly at one side toward an opposite side of the vehicle body 5 below the coupling plate 131. A front end of the operating rod R of the operation cylinder 151 is hinged to one upper side of the housing 133. In addition, one end of the coupling link 153 may be fixedly mounted on a lower portion of the coupling plate 131 at an opposite side of the operation cylinder 151 toward the vehicle body 5, while the other end of the coupling link 153 may be hinged to the other upper side of the housing 133.

Figure 4:
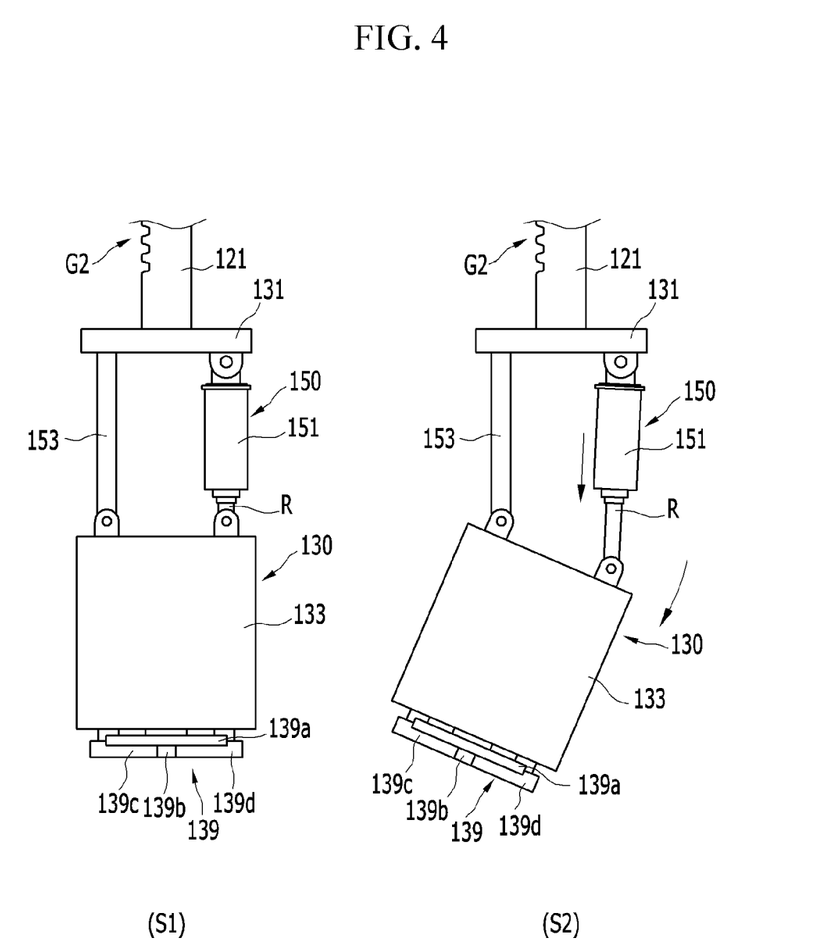
FIG. 4 is an operational state diagram of a measure module according to embodiments of the present disclosure.

As shown in S1 of FIG. 4, when a position of the barcode or VIN carved on the vehicle body 5 is perpendicular to the measure module 130, the aforementioned configured inclination adjusting unit 150 maintains an initial state in which the operation cylinder 151 does not operate to maintain a straight line of the housing 133 and the moving rod 121.

On the other hand, when the position of the barcode or VIN carved on the vehicle body 5 is not perpendicular to the measure module 130, the inclination adjusting unit 150 may operate the operation cylinder 151 so as to correspond to the position of the barcode or the VIN to progress the operating rod R. Then, as shown in S2 of FIG. 4, the housing 133 maintains a state in which the housing 133 is rotated at a predetermined angle toward the vehicle body 5 based on one end of the coupling link 153.

In the present embodiments, the camera 135 is installed in an inner central portion of the housing 133, is electrically connected to the controller C, and outputs a photographed image of the VIN or the barcode. Here, the controller C recognizes the VIN or barcode of the moved vehicle body 5 from the photographed VIN or the barcode output from the camera 135 and automatically inputs information of the moved vehicle body 5. The installation plate 137 is installed on the opened lower surface of the housing 133, and a through hole H is formed on a central portion to correspond to the camera 135. Thus, the camera 135 may smoothly photograph the barcode or VIN carved on the vehicle body 5 through the through hole H.

As shown in FIG. 5, the lighting assembly 139 is configured as at least one lighting source to emit different color light beams and is installed to be spaced apart from the through hole H at a predetermined angle on a lower surface of the installation plate 137. The lighting assembly 139 includes first, second, third, and fourth lighting sources 139a, 139b, 139c, and 139d.

First, the first lighting source 139a is installed to be spaced apart from the through hole H at a predetermined interval on the lower surface of the installation plate 137 and is installed to emit light toward a lower portion of the housing 133. The second lighting source 139b is installed to be spaced apart from the center of the through hole H at a predetermined angle on the lower surface of the installation plate 137 in an opposite direction of the first lighting source 139a and is disposed to be inclined at a set angle toward a lower portion of the housing 133 so as to adjust an inclination angle. The second lighting source 139b may be installed on an installation bracket 141 installed on the installation plate 137 through a rotation rod 143 and rotated on the installation bracket 141 according to a selective operation of an operation motor 145, a rotation shaft of which is connected to one end of the rotation rod 143, at one side of the installation bracket 141. The operation motor 145 may include a servo motor, rotating direction and rotation speed of which is adjustable according to a control signal of the controller C. The first lighting source 139a and the second lighting source 139b may be controlled to turn ON or OFF according to the control signal of the controller C and may emit red light.

In the present embodiments, the third lighting source 139c is installed on a lower surface of the installation plate 137 at a position spaced apart from the second lighting source 139b at a predetermined angle and is disposed to be inclined at a set angle toward a lower portion of the housing 133. The third lighting source is controlled to turn ON or OFF according to the control signal of the controller C and may emit green light.

In addition, the fourth lighting source 139d is installed on the lower surface of the installation plate 137 at a portion spaced apart from the third lighting source 139c at a predetermined angle and is disposed to be inclined at a set angle toward the lower portion of the housing 133. The fourth lighting source 139d is controlled to turn ON or OFF according to the control signal of the controller C and may emit blue light.

In the present embodiments, the second, third, and fourth lighting sources 139b, 139c, and 139d may be disposed in a substantially triangular shape to be spaced apart from the camera 135 at an angle of approximately 120° and may be positioned to be inclined at degrees of about 15° to about 20° toward the vehicle body 5 from the lower portion of the installation plate 137.

An operation of the aforementioned configured lighting assembly 139 will be described with reference to FIG. 6.

Figure 6:
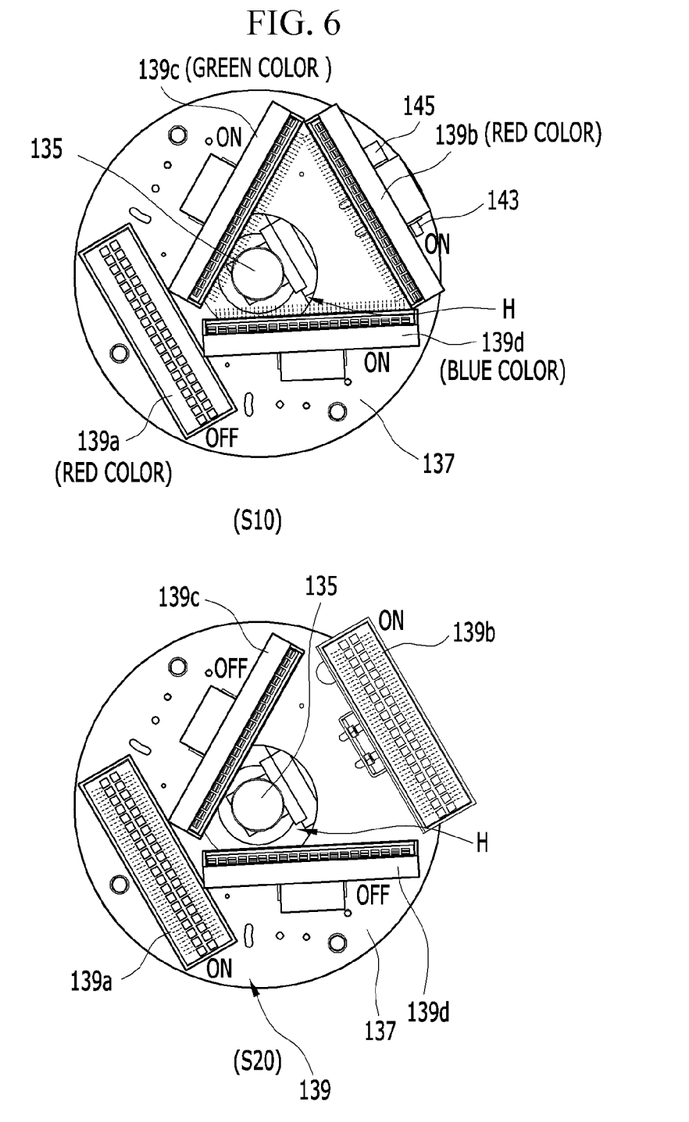
FIG. 6 is an operational state diagram of lighting sources applied to a measure module of a vehicle information inspecting apparatus according to embodiments of the present disclosure.

FIG. 6 is an operational state diagram of lighting sources applied to a measure module of a vehicle information inspecting apparatus according to embodiments of the present disclosure.

In the present embodiments, when the VIN of the vehicle body 5 closed to the measure module 130 is photographed through the camera 135 (e.g., in the case of photograph of a VIN), the second lighting source 139b may be ON and emit light according to the control signal of the controller C, and the first lighting source 139a may be OFF, while the third lighting source 139c and the fourth lighting source 139d are inclined at the same inclination angle, as shown in S10 of FIG. 6. That is, when the second, third, and fourth lighting sources 139b, 139c, and 139d become substantially close to the VIN carved on the vehicle body 5, the second, third, and fourth lighting sources 139b, 139c, and 139d emit different color beams toward the Vin and emit light via an indirect lighting irradiating method.

In this case, the camera 135 may be disposed to be close to the vehicle body 5 and may be barely affected by movement of the vehicle body 5, and thus, may capture photographs via progressive scanning. Therefore, the camera 135 may more accurately photograph the VIN carved on the vehicle body 5 via operations of the second, third, fourth lighting sources 139b, 139c, and 139d that emit light via an indirect lighting irradiating method.

In the present embodiments, the case in which the camera 135 performs photograph via progressive scanning when the measure module 130 and the vehicle body 5 are close to each other has been described hereinabove. However, the present disclosure is not limited thereto and photograph may be performed via interlaced scanning.

For the purposes of the present disclosure, the progressive scanning refers to a method for sequentially displaying an image from start to end of content to be displayed on a screen, and the interlaced scanning refers to a method for alternately displaying an image that is divided in odd and even horizontal lines.

On the other hand, when the vehicle body 5 spaced apart from the measure module 130 by a predetermined distance or more is photographed via the camera 135 (e.g., in the case of barcode photograph), the second lighting source 139b is rotated together with the rotation rod 143, which is rotated by the operation motor 145, toward a lower surface of the housing 133, which corresponds to the same direction as the first lighting source 139a, as shown in S20 of FIG. 6.

In this state, the second lighting source 139b is ON and emits light together with the first lighting source 139a, while the third lighting source 139c and the fourth lighting source 139d are OFF. That is, when the first and second lighting sources 139a and 139b are relatively far from the vehicle body 5, the first and second lighting sources 139a and 139b emit the same color light, i.e., red light, toward the barcode attached to the vehicle body 5 via a direct lighting irradiating method.

In this case, the camera 135 may be disposed to be far from the vehicle body 5 and may be largely affected by movement of the vehicle body 5 that is moved along the vehicle body moving line 3 and thus may perform photograph via interlaced scanning. Thus, the camera 135 may more accurately photograph the barcode attached on the vehicle body 5 via operations of the first and second lighting sources 139a and 139b that emit light via direct light method. That is, as described above, the vehicle information inspecting apparatus 100 according to embodiments of the present disclosure moves the measure module 130 to corresponds to a position of the barcode or the VIN carved on the vehicle body 5 that is moved along the vehicle body moving line 3 via operations of the first and second moving units 110 and 120.

Then, when the measure module 130 selectively operates the lighting assembly 139 according to a distance from the vehicle body 5 to emit light via indirect or direct lighting irradiating method, the camera 135 photographs the VIN or the barcode and outputs a captured image to the controller C. The controller C may then recognize the VIN or the barcode of the corresponding vehicle body 5 that is moved along the vehicle body moving line 3 from the captured image transmitted from the camera 135 and automatically inputs and inspects vehicle information. Thus, when the aforementioned configured vehicle information inspecting apparatus 100 according to embodiments of the present disclosure is utilized, the vehicle information inspecting apparatus 100 may photograph and accurately inspect information of the vehicle body 5 irrespective of a position of the barcode or the VIN carved on various types of vehicle bodies 5 that are moved along the vehicle body moving line 3. That is, the techniques disclosed herein may be applied to any vehicle, regardless of the particular positioning of the vehicle's VIN and/or barcode.

In addition, one apparatus may be commonly applied to various vehicle types irrespective of the vehicle body 5 with various shapes and sizes according to vehicle type, thereby reducing installation costs. While photographing the VIN or the barcode, the vehicle information inspecting apparatus 100 may be configured to change an irradiating method of the lighting assembly 139 included in the measure module 130 according to a distance from the vehicle body 5 into a direct or indirect lighting irradiating method so as to prevent an image captured by the camera 135 from being distorted in advance to perform accurate inspection. In addition, the barcode or the VIN inspected from the captured image may be automatically input. Thus, a conventional operation in which an operator inspects the barcode or the VIN through a CCTV and then manually inputs the barcode or the VIN may be omitted, improving productivity and reducing labor costs.

The vehicle information inspecting apparatus 100 according to embodiments of the present disclosure photographs and inspects a barcode or a VIN carved on a vehicle body 5 that is moved along a vehicle body moving line 3, as has been described hereinabove. However, the present disclosure is not limited thereto and may be applied to various codes (e.g., a QR code, etc.) for identifying information of the vehicle body 5 including a VIN and a barcode.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A vehicle information inspecting apparatus installed on a vehicle body moving line for moving a vehicle body, on which a vehicle identification number (VIN) is carved and a barcode is attached, and for recognizing and inspecting the barcode and the VIN, comprising:

an installation frame installed on the vehicle body moving line in a workplace;

a first moving unit installed in an upper portion of the installation frame and a moving block configured to move in a vehicle width direction of the vehicle body;

a second moving unit installed at one side of the moving block and a moving rod configured to move in upward and downward directions on the installation frame; and a measure module photographing and recognizing the barcode or the VIN and installed on a lower end of the moving rod to transmit the recognized VIN or the recognized barcode to a controller, wherein the measure module includes: a coupling plate installed at a lower end of the moving rod; a housing installed on a lower portion of the coupling plate through an inclination adjusting unit and having an open lower portion; a camera installed in an inner central portion of the housing; an installation plate installed on the opened lower surface of the housing and having a through hole formed in a central portion thereof to correspond to the camera; and at least one lighting assembly installed spaced apart from the through hole at a predetermined angle on a lower surface of the installation plate.

2. The vehicle information inspecting apparatus of claim 1, wherein the first moving unit includes:

a lead screw rotatably installed in a length direction of the installation frame in an upper portion of the installation frame toward the vehicle body and screwed to the moving block; and a first drive motor installed on an upper portion of the installation frame to correspond to the lead screw and having a rotational axis connected to the lead screw.

3. The vehicle information inspecting apparatus of claim 2, wherein the first drive motor is electrically connected to the controller and includes a servo motor, a rotating direction and a rotation speed of which are adjustable according to a control signal of the controller.

4. The vehicle information inspecting apparatus of claim 2, wherein the moving block has an upper surface connected to a railblock sliding on a guide rail formed in a length direction on an upper internal side surface of the installation frame.

5. The vehicle information inspecting apparatus of claim 1, wherein the second moving unit includes:

a gear box installed at one side of the moving block;

a second drive motor installed at an external portion of the gear box and having a rotation shaft inserted into the gear box;

a guide housing installed in the gear box at an opposite side of the moving block and having both end portions of the moving rod protruding into the guide housing, wherein they are moveable in upward and downward directions;

a drive gear installed at a rotation shaft of the second drive motor in the gear box; and a rack gear formed on one surface of the moving rod to engage with the drive gear.

6. The vehicle information inspecting apparatus of claim 5, wherein the second drive motor is electrically connected to the controller and includes a servo motor, a rotating direction and a rotation speed of which are adjustable according to a control signal of the controller.

7. The vehicle information inspecting apparatus of claim 1 wherein the inclination adjusting unit includes:

an operation cylinder including an operation rod having a front end hinged to one side of the housing, wherein the operating rod is installed downwardly at an opposite side of the vehicle body below the coupling plate; and a coupling link having one end mounted on the coupling plate at an opposite side of the operation cylinder toward the vehicle body and the other end hinged to the other side of the housing.

8. The vehicle information inspecting apparatus of claim 1, wherein the at least one lighting assembly includes:

a first lighting source installed spaced apart from the through hole at a predetermined interval on a lower surface of the installation plate and installed to emit light toward a lower portion of the housing;

a second lighting source installed spaced apart from the through hole at a predetermined angle on the lower surface of the installation plate in an opposite direction of the first lighting and inclined at a set angle toward the lower portion of the housing to adjust an inclination angle;

a third lighting source installed on the lower surface of the installation plate at a position spaced apart from the second lighting at a predetermined angle and inclined at the set angle toward the lower portion of the housing; and a fourth lighting source installed on the lower surface of the installation plate at a portion spaced apart from the third lighting source at a predetermined angle and inclined at the set angle toward the lower portion of the housing.

9. The vehicle information inspecting apparatus of claim 8, wherein the first lighting source and the second lighting source emit red light.

10. The vehicle information inspecting apparatus of claim 8, wherein the second lighting source is installed on an installation bracket that is installed on the installation plate through a rotation rod and is rotated on the installation bracket according to a selective operation of an operation motor, a rotation shaft of which is connected to one end of the rotation rod at one side of the installation bracket.

11. The vehicle information inspecting apparatus of claim 8, wherein the second, third, and fourth lighting sources are disposed in a substantially triangular shape and spaced apart from the camera at an angle of approximately 120 degrees.

12. The vehicle information inspecting apparatus of claim 8, wherein the third lighting source emits green color light.

13. The vehicle information inspecting apparatus of claim 8, wherein the fourth lighting source emits blue color light.

14. The vehicle information inspecting apparatus of claim 8, wherein the second lighting source emits light in the same state, while the third lighting source or the fourth lighting source is inclined at the same inclination angle, and the first lighting source is OFF, when the camera photographs the vehicle body substantially close to the measure module.

15. The vehicle information inspecting apparatus of claim 8, wherein the second lighting source emits light together with the first lighting source while being rotated toward a lower surface of the housing, and the third lighting source and the fourth lighting source are OFF, when the camera photographs the vehicle body spaced apart from the measure module by a predetermined distance or more.

* * * * *